(12) United States Patent
Ferguson (10) Patent No.: US 6,588,933 B2
(45) Date of Patent: Jul. 8, 2003

(54) THRUST BEARING

(75) Inventor: James Harold Ferguson, Peterborough (CA)

(73) Assignee: General Electric Canada Inc., Mississauga (CA)

( * ) Notice: Subject to any disclaimer, the term of this patent is extended or adjusted under 35 U.S.C. 154(b) by 0 days.

(21) Appl. No.: 09/982,254

(22) Filed: Oct. 19, 2001

(65) Prior Publication Data

US 2002/0051592 A1 May 2, 2002

(30) Foreign Application Priority Data

Oct. 26, 2000 (CA) .............................................. 2324322

(51) Int. Cl.⁷ .............................................. F16C 17/06
(52) U.S. Cl. ...................................... 384/122; 384/307
(58) Field of Search ................................ 384/112, 122, 384/306, 307, 308

(56) References Cited

U.S. PATENT DOCUMENTS

| | | | |
|---|---|---|---|
| 1,825,519 A | 9/1931 | Gordon | |
| 3,408,122 A | 10/1968 | Burger | |
| 3,583,776 A | 6/1971 | Kuhn | |
| 3,905,657 A | 9/1975 | Ishida et al. | |
| 4,270,064 A | 5/1981 | Glandorf et al. | |
| 4,455,098 A | 6/1984 | Pollok | |
| 4,494,882 A | 1/1985 | Pollok | |
| 4,699,524 A | 10/1987 | Bath | ........................... 384/306 |
| 5,288,153 A | 2/1994 | Gardner | ...................... 384/311 |

FOREIGN PATENT DOCUMENTS

| | | |
|---|---|---|
| CA | 889218 | 12/1971 |
| DE | 23 49 190 | 3/1975 |

*Primary Examiner*—Lenard A. Footland (57) ABSTRACT

A thrust bearing for a rotating machine has a rotating ring and a bearing shoe for use in a non-filled oil chamber that permits oil flow through the bearing shoe. The oil flows out a leading recessed groove in the bearing shoe and across the bearing shoe surface. This permits for the oil flow to cool the bearing shoe and maintain lubrication between the bearing shoe and the rotating ring. Further, the non-filled oil chamber acts more as an oil collection chamber which provides two distinct advantages. One advantage is a reduction in bearing losses not present due to the elimination of swirling of the oil bath. The other advantage is one of servicing by the ability to inspect the bearings and all oil conduit connections without being encumbered by oil partially covering or surrounding the bearing shoe. The thrust bearing has an oil reservoir located below the non-filled oil chamber into which oil drains from the non-filled oil chamber and an oil cooling and circulating system comprising a pump, heat exchanger and conduit connectors connected to each oil inlet for circulating oil drained into the oil reservoir through the heat exchanger into the flexible hoses and back into the bearing shoes. Further, the thrust bearing shoe has a secondary oil inlet adjacent the leading edge of the bearing shoe providing a safety back-up lubrication source.

6 Claims, 7 Drawing Sheets

THRUST BEARING

FIELD OF THE INVENTION

The present invention relates to large vertical and horizontal shaft machines, and in particular it relates to the lubrication of the thrust bearings used in such machines.

BACKGROUND OF THE INVENTION

Thrust bearings for large vertical shaft machines usually comprise a downwardly facing ring that is mounted to the rotating component of the machine and a plurality of shoes or bearing segments with upwardly directed bearing surfaces. The bearing shoes support the rotating ring on an oil film which is usually supplied by having the ring and the bearing shoes submerged in an oil bath. The bearing shoes are mounted on a pivot, or by some other means that permits a limited pivoting action, so that the shoe is able to tilt down slightly at the leading edge to form the oil film into a slight wedge-shaped configuration. The tilting action also provides for alignment of the shoe surface with the surface of the rotating ring.

U.S. Pat. No. 3,905,657 issued Sep. 16, 1975 to Isao Ishida et al discloses a thrust bearing shoe that includes an overflow chamber surrounding leading and side circumferencial surfaces of the bearing shoe into which oil is fed to provide an oil film for the sliding surface of the bearing shoe and the rotating ring of the bearing pad. This permits the lubricating oil in the oil bath to be reduced below the level of the rotating ring eliminating agitation of the oil in the oil bath caused by rotation of the bearing rotating ring. However, the bearing shoes rely on their partial immersion in the oil bath and the oil passing from the overflow chamber for cooling. The loads that can be sustained by this thrust bearing are limited by the value of the oil film thickness on the bearing surface, the temperature rise of the lubricant, and the temperature of the bearing shoe. Because the ring and exterior surfaces of the bearing shoe are not immersed in the oil bath, there is a significant reduction in cooling, which becomes more critical at high speed and limits the loads capable of being sustained by the thrust bearings.

U.S. Pat. No. 4,699,524 issued Oct. 13, 1987 to Duncan Bath discloses thrust bearing shoes immersed in the oil bath having a supplementary cooling arrangement to lower and evenly distribute the temperature rise experienced by the bearing shoes. Each of the bearing shoes have at least an upper and a lower portion with a junction between said portions defining a supplementary cooling plane. Passages extend in at least one of the portions for conducting oil through the shoe. The passages have ends terminating at an outer curved end of the shoe. First and second nozzles are attached to each shoe at the end of the passages The nozzles are immersed in the oil bath and oriented to draw oil from the oil bath into the shoe and expel oil from the shoe back into the oil bath in accordance with the movement of oil in the oil bath resulting from the rotating ring agitating the oil. While this bearing shoe has an improved cooling capacity, the bearing losses associated with the drag of the oil bath are present.

Accordingly a need has existed for several years to provide a thrust bearing that has a relatively even and efficient cooling capacity for the thrust bearing so as to control the temperature rise of the coolant on the bearing surface and the temperature of the bearing shoe while at the same time eliminating bearing losses associated with a filled oil bath in which the bearing shoes and the rotating ring are immersed.

SUMMARY OF THE INVENTION

The present invention relates to a thrust bearing for use in vertical and horizontal shaft rotating machines. The thrust bearing has a plurality of segmental bearing shoes for use in a non-filled oil collecting chamber that permits oil flow through each bearing shoe, out an leading recessed groove in the bearing shoe and across the bearing shoe upper surface. The bearing shoe of the present invention utilizes cooling passages through the interior of the bearing shoe while maintaining lubrication between the bearing shoe and the rotating ring by flowing oil from a leading edge groove of the bearing shoe. Neither of the rotating ring nor bearing shoes are immersed in an oil bath. Further, the non-filled oil chamber acts more as an oil collection chamber which provides two distinct advantages. One advantage is a reduction in drag losses due to maintaining the level of oil below the machine rotor. Another advantage is one of servicing by the ability to inspect the bearings and all oil conduit connections without being encumbered by an oil level in the chamber covering or partially covering and surrounding the bearing shoes.

In accordance with one aspect of the present invention there is provided a thrust bearing for a rotating machine comprising a non-filled oil chamber, a rotating ring for mounting to a vertical shaft of the rotating machine, and a plurality of segmented bearing shoes. The rotating ring has a first bearing surface. The shoes are mounted in the non-filled oil chamber. Each of the segmented bearing shoes comprises a second surface over which the rotating ring first bearing surface slides. Each bearing shoe has a leading edge and a trailing edge in a direction of shaft rotation. The shoe has an oil inlet located adjacent one of the leading edge and the trailing edge and oil filled passages extending within the bearing shoe from the oil inlet towards the leading edge of the shoe. The shoe further has a recessed groove extending across the bearing shoe adjacent the leading edge in fluid communication with the passages for directing oil from the passages along the groove towards the rotating ring whereby oil passes in the oil inlet, along the passages to regulate bearing shoe temperature and out the groove to spread a lubricating oil film to the leading edge of the bearing segments and between the first and second bearing surfaces.

It is also within the realm of the present invention for the thrust bearing to include an oil reservoir located below the non-filled oil chamber into which oil drains from the non-filled oil chamber and an oil cooling and circulating system comprising a pump, heat exchanger and conduit connectors connected to each oil inlet for circulating oil drained into the oil reservoir through the heat exchanger into the conduit and back into the bearing shoes.

It is also within the realm of the present invention for the thrust bearing shoe to include a secondary oil inlet adjacent the other of the leading edge and trailing edge of the bearing shoe. The secondary oil inlet is in fluid communication with the oil filled passages and the recessed groove for providing a safety back-up lubrication and cooling supply.

Further, due to the non-filled aspect of the oil chamber, an oil supply manifold is included in the chamber that supplies oil to the bearing shoes.

BRIEF DESCRIPTION OF THE DRAWINGS

For a better understanding of the nature and objects of the present invention reference may be had to the accompanying diagrammatic drawings in which.

DESCRIPTION OF THE PREFERRED EMBODIMENTS

Figure 1:
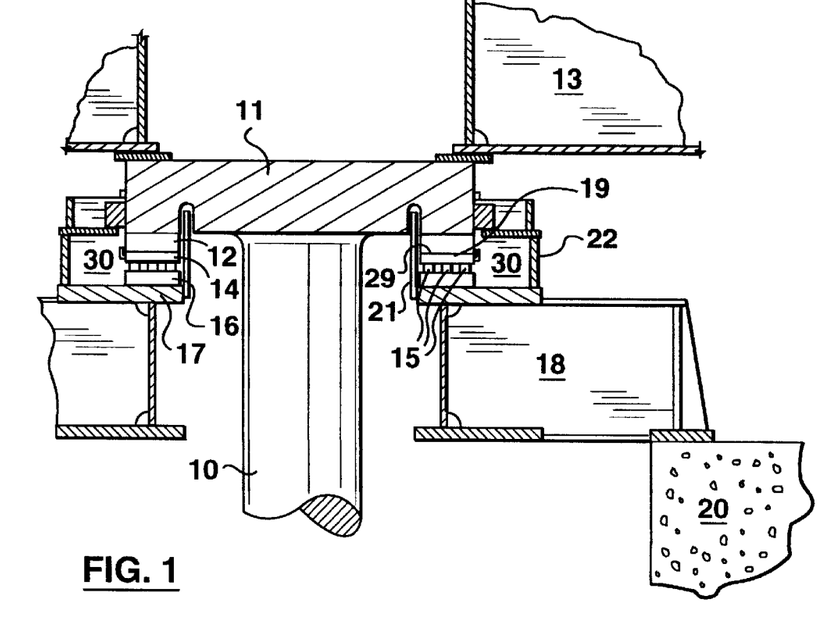
FIG. 1 is a sectional elevation showing a vertical machine shaft with a thrust bearing according to the invention.

Referring to FIG. 1, there is shown a thrust bearing mounting and support structure for a vertical shaft machine such as a hydraulic generator, a motor, or a generator motor for pumped storage. A vertical shaft 10 extends downwardly to a pump or a turbine (not shown). At the upper end of shaft 10 is a coupling flange 11 to which is coupled a rotor of a dynamoelectric machine indicated by structure 13 but not shown in full. To the underside of flange 11 there is mounted a rotating ring 12. The rotating ring 12 is backed by the relatively massive flange 11 which serves as a thrust block. Ring 12 has a downwardly directed bearing surface 19. Facing ring 12 is a plurality of bearing segments or shoes 14, each with an upwardly directed bearing surface 29. While the thrust bearing is shown below the rotor, the location of the thrust bearing may also be located above the rotor.

The shoes 14 are spaced adjacent one another around shaft 10 as is known. A plurality of elements 15, which may be coiled springs, hydraulic elements or other flexible elements extend from base ring 16 to each bearing segment 14. The elements 15 are arranged to permit limited tilting and vertical movement of each bearing segment or shoe 14.

The base ring 16 is supported on a heavy backing ring 17 which is mounted to a frame 18. The frame 18 is mounted to a foundation structure 20. Walls 21 and 22 extend upwardly from backing ring 17 to form a non-filled oil enclosure or chamber 30 for collecting or capturing oil when the machine is operating. The surfaces of rotating ring 12 and shoes 14, which are not immersed in oil, have between them a hydrodynamic oil film for lubricating the bearing surfaces.

Figure 2:
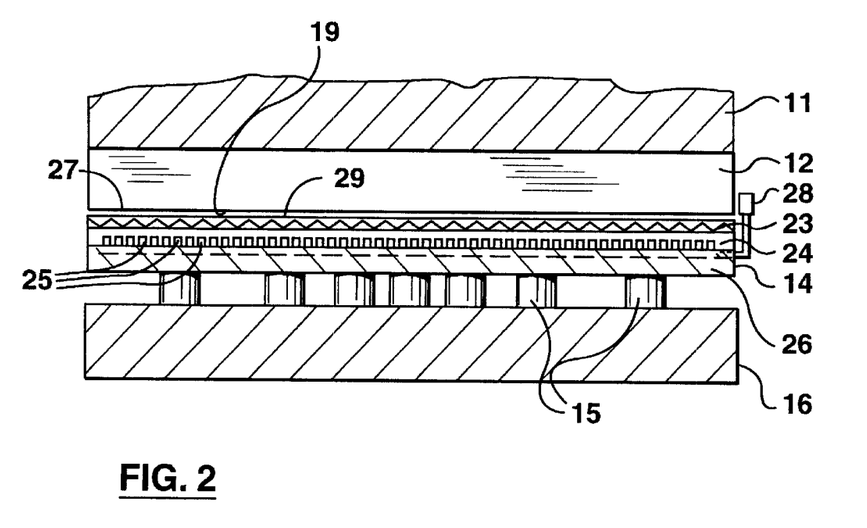
FIG. 2 is a sectional view taken through the rotating ring and a supporting shoe.

Referring now to FIG. 2, the structure of the bearing segment 14, with rotating ring 12, is shown in more detail. A portion of coupling flange 11 is shown with rotating ring 12 fastened thereto. The rotating ring 12 is usually of steel. The shoe 14 has an upper layer of babbitt 23 bonded to an upper portion or segment 24. The upper segment 24 has passages 25 in its lower surface to provide a heat exchange configuration which will be described in more detail subsequently. The passages 25 define a supplementary cooling plane. An oil inlet nozzle 28 is shown for providing oil to passages 25 as will also be described subsequently. The upper segment 24 is supported by a lower portion 26. The lower portion 26 of the shoe is supported from base ring 16 by support elements 15, such as springs, flexible mechanical elements, hydraulic elements, or the like. The upper segment 24 may comprise steel or copper metal having a high thermal conductivity. The lower portion 26 is preferably steel.

The dimensions of the various parts of shoe 14, as shown in FIG. 2, have been exaggerated for ease of illustration. As an example only of suitable thicknesses, the babbitted layer 23 might be of the order of 2 mm thick, the upper segment 24 might be of the order 30 mm to 60 mm thick, and the lower backing portion 26 might be a thin layer of steel. The film 27 of lubricating oil would, of course, vary in thickness depending on operating conditions.

Figure 4:
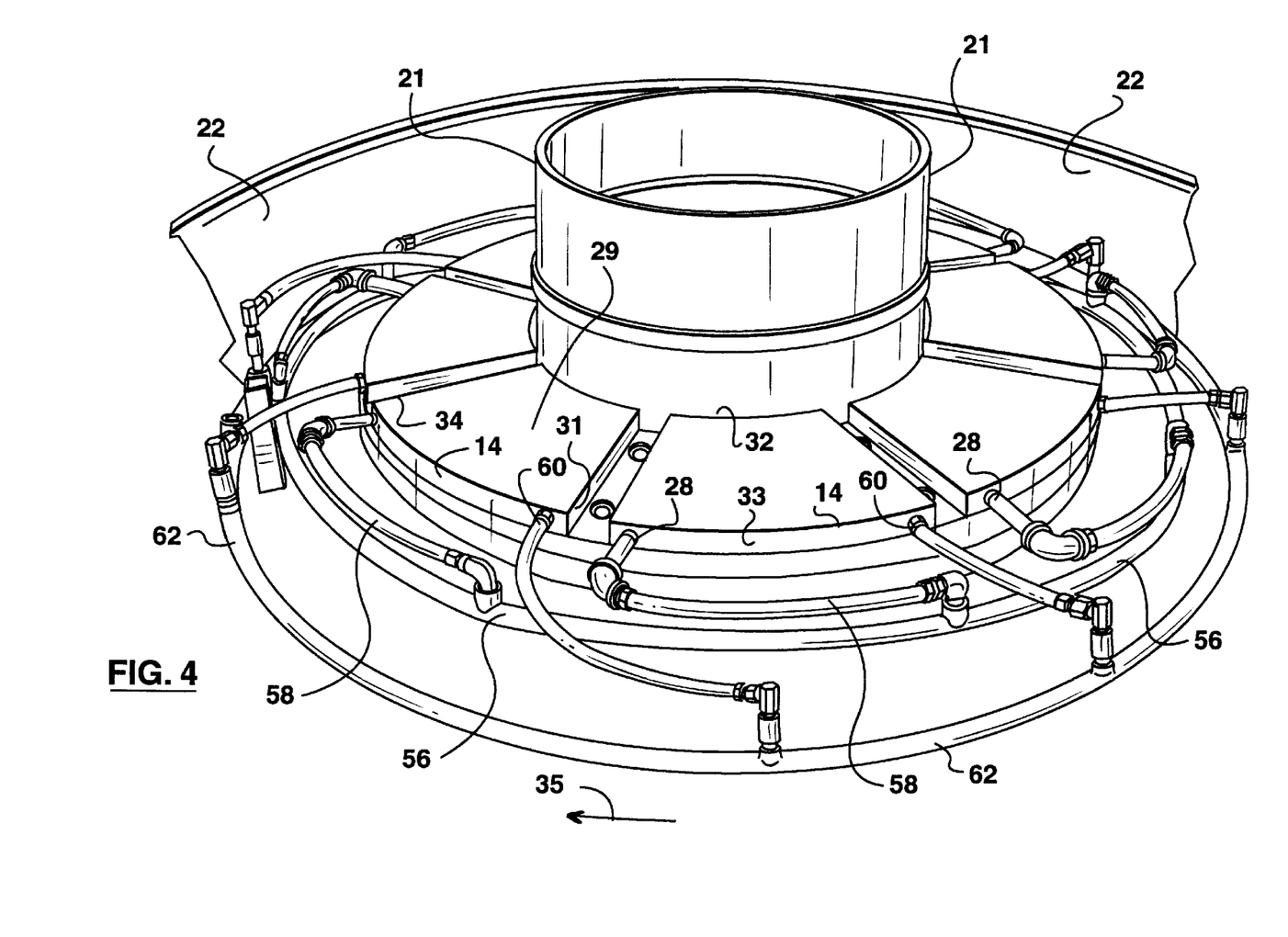
FIG. 4 is a schematic view showing the flexible hose connections to the bearing shoe.

Referring now to FIG. 4 there is shown the flexible hose connection utilized by the thrust bearing. The inlet 28 of the thrust bearing is preferably located at a trailing section of the thrust bearing or trailing edge 34 in order to obtain the optimal heat transfer at the warmest surface. The bearing shoe 14 further includes a radial inner surface 32, a radial outer surface 33 and the leading edge 31 and trailing edge 34. The trailing edge 34 is defined relative to the leading edge 31 as by the direction of vertical shaft rotation indicated by arrow 35. The upper bearing surface 29 extends between the leading edge 31 and the trailing edge 34 between the inner and outer radial surfaces 32 and 33.

Figure 5:
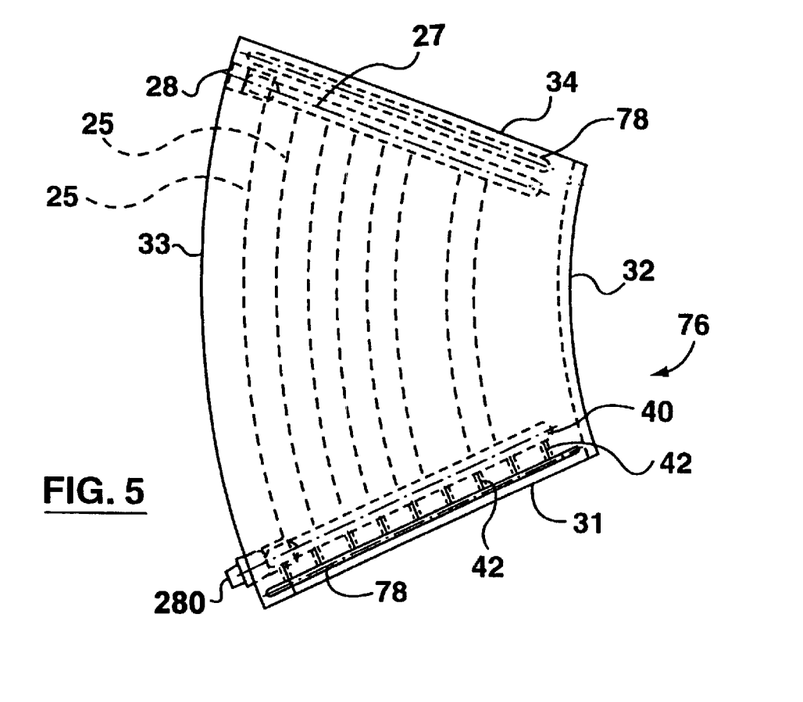
FIG. 5 is a plan view of the top segment of the bearing shoe.

The oil inlet 28 is preferably located on the radial outer surface 33 adjacent the trailing edge 34 (as shown in FIG. 5) so that the oil flows through the passageway 27 from the outer radial surface 33 to the inner radial surface 32 and then circumferentially through passages 25 to a radially leading passageway 40. This radial leading passageway 40 has a series of outlet ports 42 extending or sloping upwardly and forward at about a 45° angle towards the leading edge 31. These ports 42 permit for the oil to flow out recessed groove 43 both forward of the leading edge 31 and back across the bearing surfaces 19, 29 due to the rotation of rotating ring 12. This provides for a relatively improved or good oil film lubrication across the bearing surfaces 19, 29. The oil emitted from groove 43 provides the oil for the film.

Figure 3:
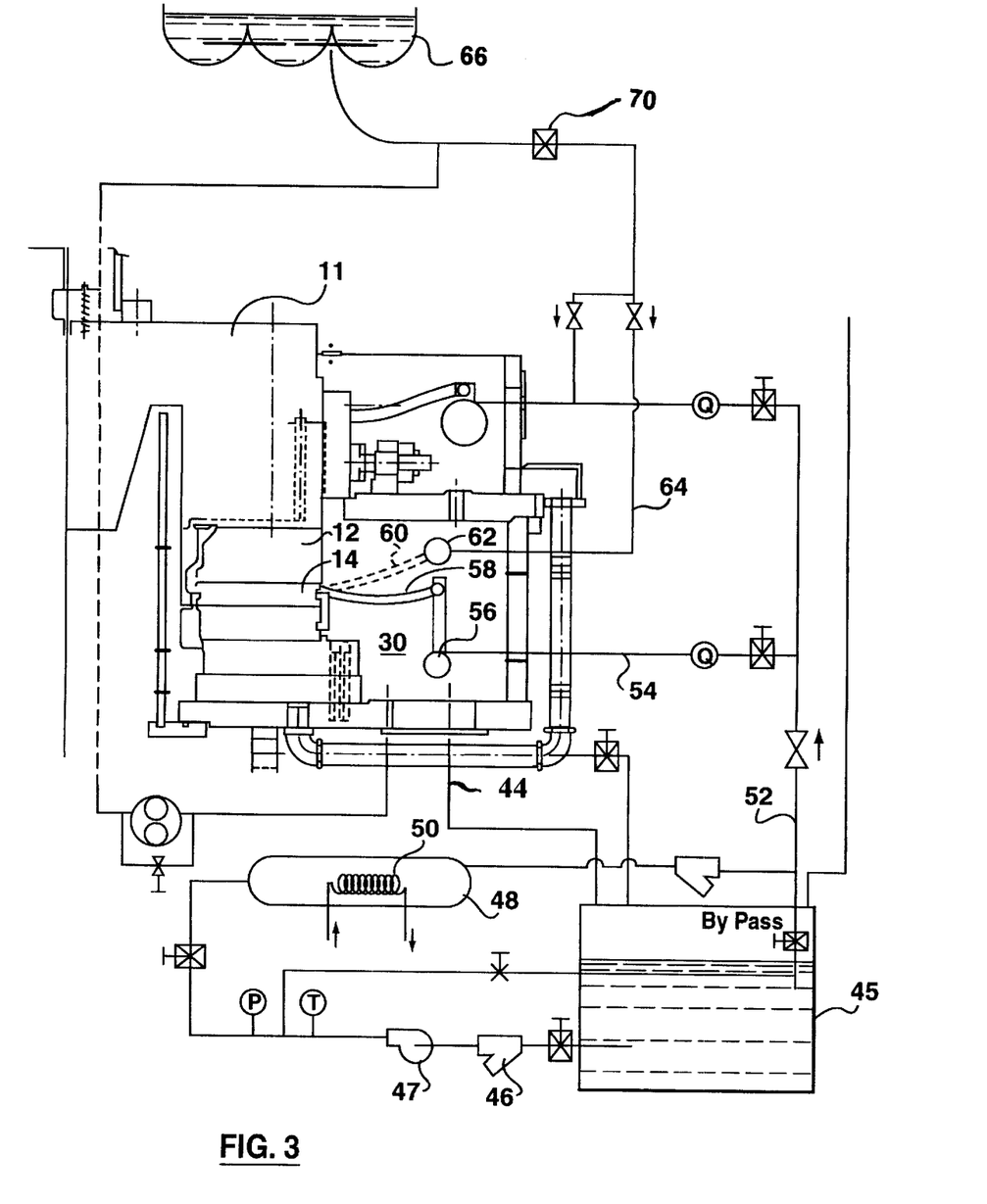
FIG. 3 is partial sectional view similar to FIG. 1 showing the piping connections of the present invention.

The oil film ultimately drains from the thrust bearing down to the bottom of the non-filled oil chamber 30 as shown in FIG. 3. The non-filled oil chamber 30 is provided with a drain 44 which permits the oil to be re-circulated back to a main oil tank 45. The main oil tank 45 has piping 46 connected to it which includes a strainer 46 for removing foreign articles from the oil and a circulation pump 47 which pumps the oil through the cooler 48. The cooler 48 is cooled by a looped coil through which cool water flows at 50. The piping then returns the oil back through conduits 52 and 54 to a manifold 56 located within the oil non-filled oil chamber 30. The manifold 56 has associated therewith a conduit in the form of flexible hoses 58 which connect to the inlet 28 of the bearing shoe.

The circulating system shown in FIG. 3 further includes an additional conduit connector 60 which is connected to the leading edge opening or inlet in the thrust bearing shoe. This inlet is adjacent the leading edge groove and the conduit 60 is connected through its own manifold 62 to piping 64 back to a series of head tanks 66. The head tanks 66 are located well enough above the thrust bearing and feed via gravity oil to the thrust bearing. The oil is maintained in head tanks 66 by solenoid valve 70. In the event that there is a failure with the main supply through manifold 56 to the trailing edge 34 of the bearing shoes 14, solenoid valve 70 is opened and oil flows automatically into bearing inlet 280 at the leading edge 31. In this emergency situation, the drain is closed so that the oil chamber fills with the oil from the head tanks 66 above the segmented bearing shoes. It should be understood that this is not a corrective or replacement measure but is a safety measure which provides for the large rotating machine to be brought to a halt which may take several minutes due to the machine inertia.

From FIGS. 3 and 4 it is evident that because there is no oil in the oil chamber 30, the oil supplying manifolds 56, 62, the flexible connectors 58, 60, and the thrust bearings shoes 14 are visible for inspection. This is a safety and maintenance feature.

Referring to FIG. 5 there is shown a plan view for the bottom segment 68 of the bearing shoe 14 showing the radially extending passages 27 and the axially extending passages 25. There is also shown for the top segment 76 the bearing shoe 14 and the location of the inlet ports 28 and 280 respectively for both the main lubrication system associated or adjacent the trailing edge 34 and for the safety lubricating system adjacent the leading edge 31. This top segment 76 further shows the groove 43 extending along the surface of the upper bearing surface 29 of the bearing shoe 12.

Figure 6:
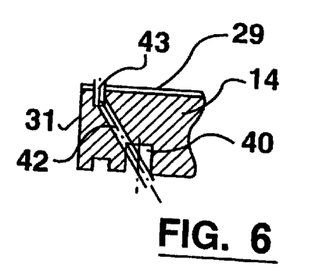
FIG. 6 is a partial sectional view showing one location for the oil supply groove in the bearing shoe; and, FIG. 7 is partial sectional view showing another location for the oil supply groove in the bearing shoe.
Figure 7:
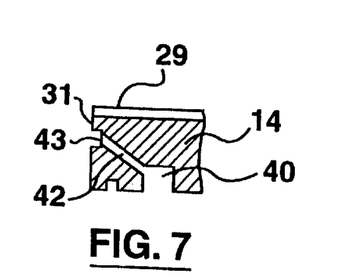

FIG. 6 shows a partial section of ports 42 angled up and forward at about 45 degree angle to the groove 43 located in the bearing surface 29 adjacent leading edge 31. It should be understood that along the surfaces adjacent the leading edge 31 and the trailing edge 34 an O-ring 78 is provided between the upper and lower bearing segment portions 68, 76. In FIG. 7, the groove 43 is located along leading edge 31 adjacent bearing surface 29.

Figure 8:
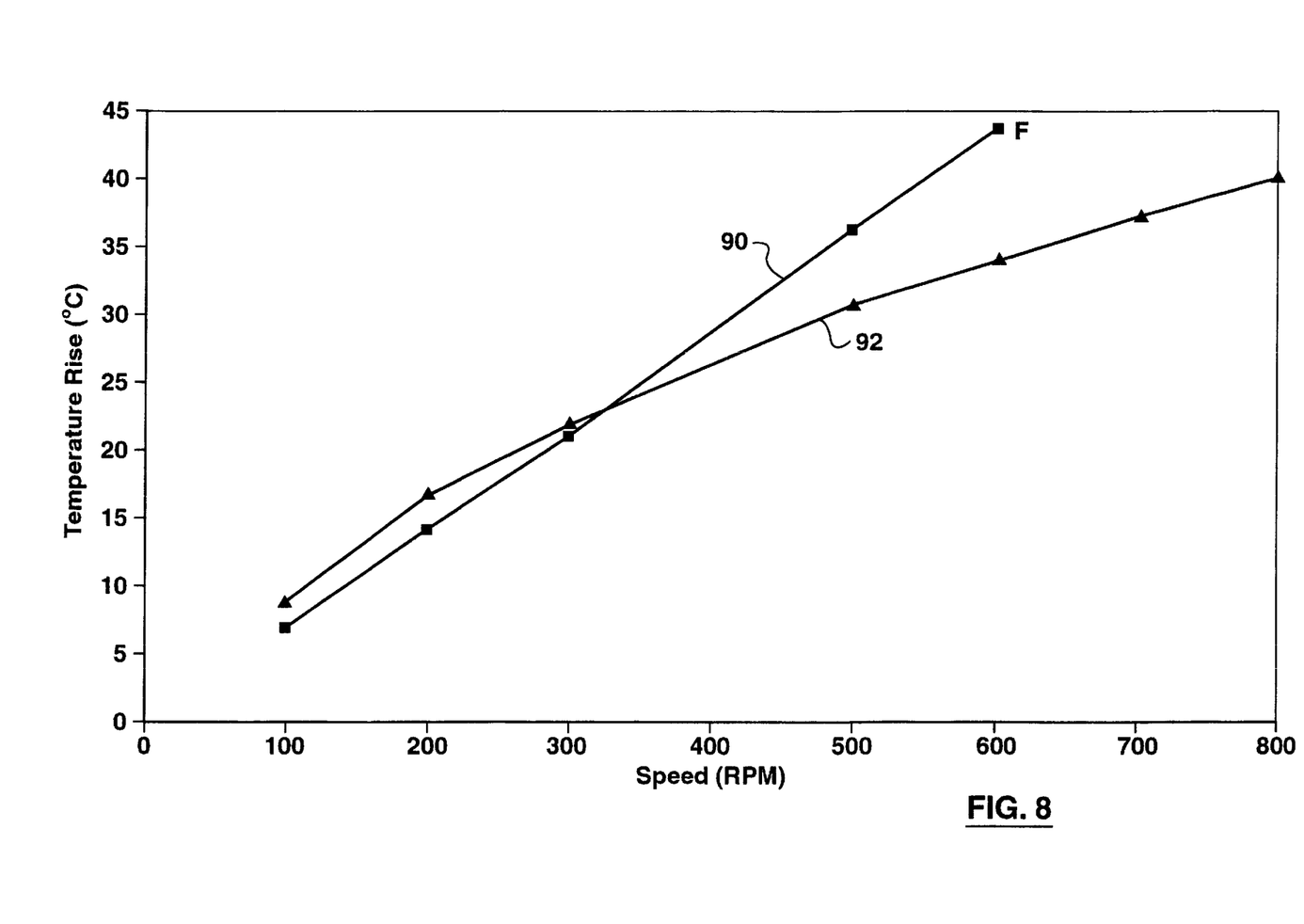
FIG. 8 is a graph illustrating the temperature performance of the thrust bearing.

Referring now to FIG. 8 there is shown a graph of temperature performance for a 46 inch diameter thrust bearing. Graph number 90 represents the prior art flooded bearing showing the temperature of the bearing as the speed increases. It is shown that the present invention of graph 92 for the non-filled 46 inch diameter bearing has a more even distribution of temperature and lower temperatures when the speed of the motor increases beyond approximately 300 RPM.

Figure 9:
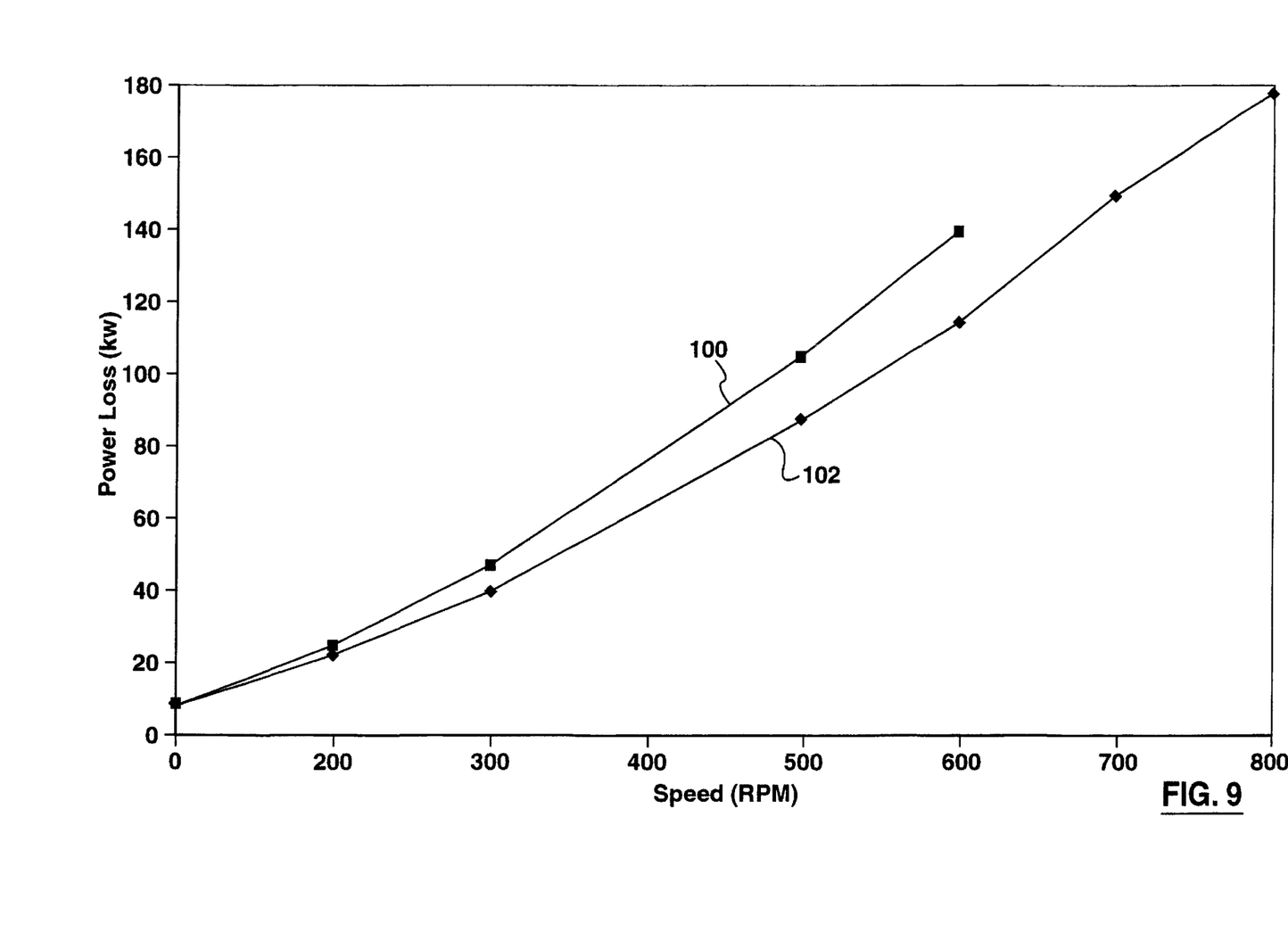
FIG. 9 is a graph illustrating the power loss of the thrust bearing.

Referring now to FIG. 9 there is shown a graph illustrating the power loss of a 46 inch thrust bearing for the present invention. It is shown that the power loss for the normal flooded bearing is at graph 100 and the power loss for the non-flooded bearing is at graph 102. Clearly, there is an improvement associated with the power loss because there has been a significant reduction in the input power utilized or required to obtain higher speeds of rotation. Because of this reduction in power loss, there is an increase in the efficiency of the machine.

Figure 10:
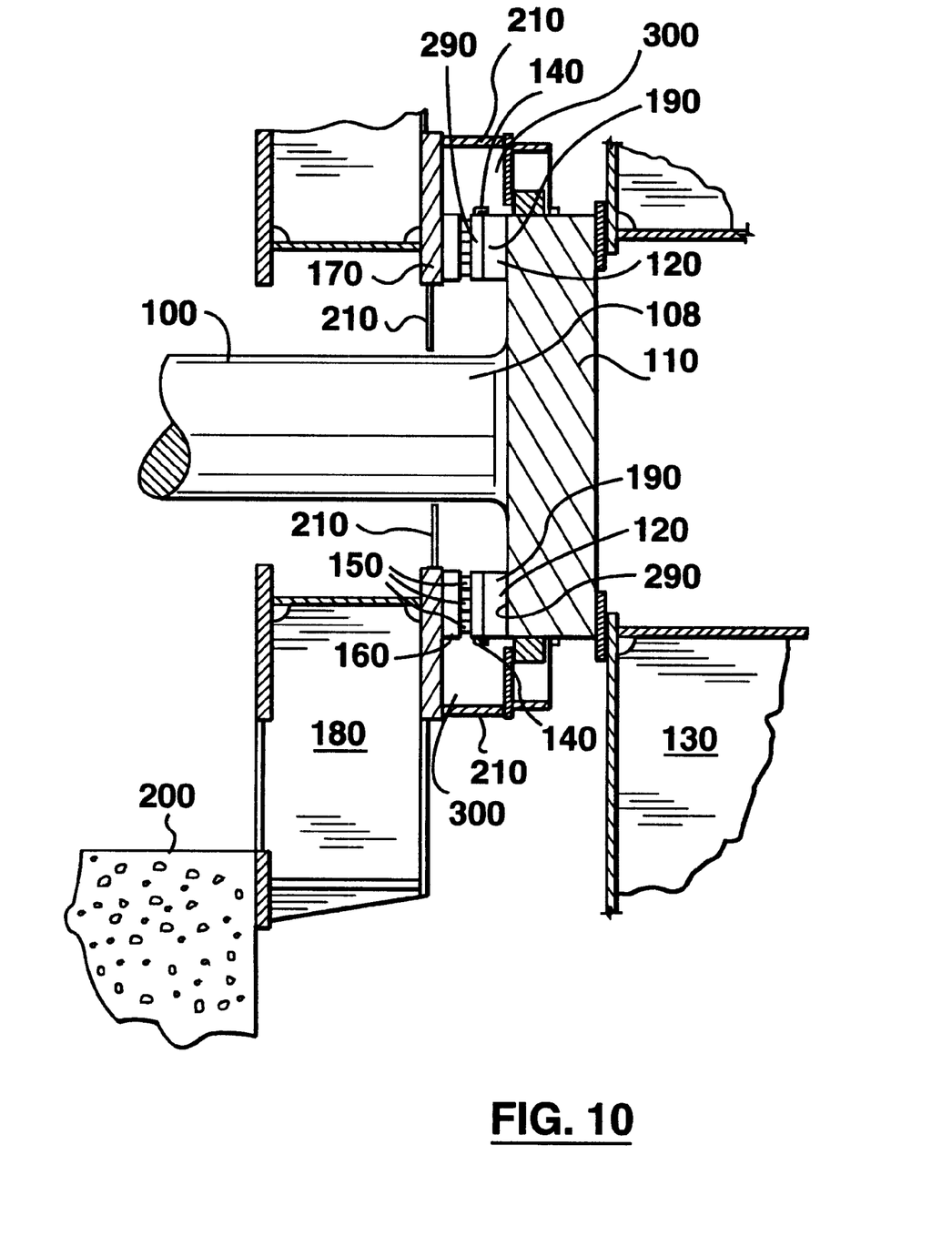
FIG. 10 is a sectional elevation of a horizontal machine shaft with the thrust bearing according to the present invention.

Referring to FIG. 10 there is shown a bearing mounting and support structure for a horizontal shaft machine such as a hydraulic generator, a motor, or a generator motor for pumped storage. A horizontal shaft 100 extends into a pump or a turbine (not shown). One end 108 of shaft 100 has a coupling flange 110 to which preferably is coupled a rotor of a dynamoelectric machine indicated by structure 130 but not shown in full. To the one side of flange 110 there is mounted a rotating ring 120. The rotating ring 120 is backed by the relatively massive flange 110 which serves as a thrust block. Ring 120 has a first bearing surface 190. Facing ring 120 is a plurality of bearing segments or shoes 140, each with a second bearing surface 290.

The shoes 140 are spaced adjacent one another around shaft 100 as is known. A plurality of elements 150, which may be coiled springs, hydraulic elements, or other flexible elements extend from base ring 160 to each bearing segment 140. The elements 150 are arranged to permit limited tiling and movement of each bearing segment or shoe 140.

The base ring 160 is supported on a heavy backing ring 170 which is mounted to a frame 180. The frame 180 is mounted to a foundation structure 200. Wall 210 extends from backing ring 170 to form a non-filled oil enclosure or chamber 300 for collecting or capturing oil when the machine is operating. The surfaces of rotating ring 120 and shoes 140, which are not immersed in oil, have between them a hydrodynamic oil film for lubricating and cooling the bearing surfaces.

It should be understood that alternative embodiments of the present invention may be readily apparent to a person skilled in the art in view of the above description for the preferred embodiments of this invention. Accordingly, the scope of the present invention should not be limited to the teachings of the preferred embodiments and should be limited to the scope of the claims that follow.

What is claimed is:

1. A thrust bearing for a rotating machine having a shaft, the thrust bearing comprising:

an oil collecting chamber;

a rotating ring for mounting to the shaft of the rotating machine, the rotating ring having a first bearing surface; and, a plurality of segmented bearing shoes mounted in the oil collecting chamber and the oil collecting chamber filled with oil to a level below the rotor and bearing shoes, each of the segmented bearing shoes comprising a second bearing surface over which the first bearing surface of the rotating ring slides, a leading edge and a trailing edge in a direction of shaft rotation, an oil inlet located adjacent one of the leading edge and the trailing edge, oil filled passages extending within the bearing shoe from the oil inlet towards the leading edge of the shoe, and a recessed groove extending across the bearing shoe adjacent the leading edge in fluid communication with the passages for directing oil from the passages along the groove towards the rotating ring whereby oil passes in the oil inlet, along the passages to regulate bearing shoe temperature and out the groove to spread a lubricating oil film to the leading edge of the bearing segments and between the first and second bearing surfaces; and, each of the bearing shoes comprising a secondary oil inlet adjacent the other of the leading edge and trailing edge of the bearing shoe, the secondary oil inlet being in fluid communication with the oil filled passages and the recessed groove for providing a safety back-up lubrication and cooling source.

2. The thrust bearing of claim 1 wherein the recessed groove extends along the leading edge of the bearing segment adjacent the second bearing surface.

3. The thrust bearing of claim 1 wherein the recessed groove extends along the second bearing surface of the bearing segment adjacent the leading edge.

4. The thrust bearing of claim 1 further comprising an oil reservoir located below the oil collecting chamber into which oil drains from the oil chamber; and an oil cooling and circulating system comprising a pump, heat exchanger and conduit connectors connected to each oil inlet for circulating oil drained into the oil reservoir through the heat exchanger into the conduit connectors and back into the bearing shoes.

5. The thrust bearing of claim 1 further including a manifold surrounding the bearing shoes and mounted within the oil collecting chamber, the manifold interconnecting the conduit connectors with an oil supply from the oil reservoir.

6. The thrust bearing of claim 1 wherein the machine has a vertically extending shaft.

* * * * *